United States Patent Office 2,850,461
Patented Sept. 2, 1958

2,850,461

SOLVENT COMPOSITIONS CONTAINING ANTI-CORROSION AGENTS

Herman S. Bloch, Skokie, and Ernest L. Pollitzer, La Grange, Ill., assignors to Universal Oil Products Company, Des Plaines, Ill., a corporation of Delaware No Drawing. Application December 16, 1955
Serial No. 553,434

19 Claims. (Cl. 252—364)

This invention relates to a solvent composition containing as the principal solvent components an oxygen-containing organic compound and an additive thereto which controls or eliminates corrosion of the metallic equipment in which the solvent is utilized, said additive comprising certain amino compounds and their simple amide or salt derivatives. More specifically, the invention concerns solvent compositions of the above character containing two or more of said amino, amide or salt compounds, one of which stabilizes the pH of the solvent composition vapors and the other controls and substantially eliminates corrosion of the extraction equipment in contact with the solvent composition in its liquid state.

One object of the present invention is to provide a solvent composition for extraction of unsaturated hydrocarbons from mixtures thereof containing more saturated components utilizing a method of solvent extraction and a solvent composition capable of producing a vapor upon distillation having a substantially constant pH in the presence of small amounts of air normally present within such extraction equipment. Another object of the invention is to avoid the corrosion of solvent extraction equipment fabricated from common structural metals in the presence of solvent compositions comprising oxygen-containing organic solvents. Still another object of this invention is to stabilize the pH of the vapor phase of a solvent composition utilized in a solvent extraction system at extractive distillation conditions and in the same system, to prevent the corrosion of the extraction equipment in contact with the solvent composition in the liquid condition.

In one of its embodiments, this invention relates to a solvent composition capable of maintaining metallic surfaces in contact with the solvent in both its liquid and vapor phases resistant to corrosion comprising a solution of at least (1) a major proportion of an oxygen-containing organic compound which selectively dissolves unsaturated hydrocarbons and cyclic hydrocarbons from mixtures thereof with more saturated hydrocarbons, (2) from 0 to about 20% by weight of water, (3) from 0.001 to about 0.5% by weight of a nitrogen-containing organic compound selected from the amines, the amine salts of fatty acids and the fatty acid amides, said compound being of lesser volatility than the solvent composition, and (4) from 0.001 to about 0.5% by weight of a pH-stabilizing additive for the solvent composition on its vapor phase selected from the amines of volatility equal to or greater than that of the solvent composition.

Other embodiments relating to specific process conditions, particular solvent compositions and anti-corrosion agents as well as to the method of employing the present compositions in typical extraction processes will be referred to in greater detail in the following further description of the invention.

The solvent composition of this invention is generally applicable to both liquid-liquid and liquid-vapor solvent extraction processes, preferably to systems employing countercurrent flow of the immiscible fluids, such as liquid-liquid or gas-liquid washing operations, gas absorption processes and other types of extraction processes in which one or more components are selectively removed from a mixture containing the same with materials of relatively little solubility therein. The solvents herein contemplated are particularly well adapted to the countercurrent type of solvent extraction process applied to hydrocarbon mixtures for the recovery of the more highly unsaturated components from the more saturated hydrocarbon compounds or for the removal and recovery of cyclic hydrocarbons, such as aromatic hydrocarbons from straight chain or aliphatic hydrocarbons.

It has been found that many oxygen-containing organic compounds of the classes hereinafter referred to exert a selective solvent action for such unsaturated and cyclic hydrocarbon species, compared to the saturated and/or aliphatic hydrocarbons. It has also been generally found that in such extraction processes, oxygen-containing organic compounds tend to undergo deterioration during use, particularly when small amounts of air are allowed to contaminate the system, the air generally oxidizing to a limited extent the organic compound, forming acidic deterioration products of highly corrosive character. Such development of corrosive acids, however, is not necessarily dependent upon the presence of air within the extraction equipment but may also arise by intercondensation of two or more molecules of the oxygen-containing organic compound, by hydrolysis of acid-generating compounds such as esters, or by the action of oxidizing agents such as organic peroxides and the like. The conversion of certain glycolic compounds which are highly effective solvents for unsaturated and cyclic hydrocarbons to corrosive oxidation products is particularly severe when operating the extraction process at a relatively high temperature, the corrosive products of such deterioration contaminating both the liquid and vapor phases present within the extraction equipment. In many instances the fabrication of extraction equipment of corrosion-resistant alloys is impractical and for many alloy steels corrosion in the presence of such oxidative deterioration products occurs at substantially the same or at a greater rate than for carbon steels, thus reducing the economic advantages of using such alternatives.

It has been known that the corrosiveness of solvent compositions in their liquid state can be substantially reduced by incorporating into the solvent composition a relatively high boiling material of alkaline character which remains dissolved in the liquid phase during the extraction process, neutralizing any acids which may form as a result of oxidative deterioration of the solvent. However, many of such non-volatile or low-volatility neutralizing agents become inactivated within a short time as a result of increasing acid production within the system, forming residues which are not readily regenerated and which are difficult to remove from the solvent composition, except by redistillation of the solvent. In most instances accompanying the use of organic solvents and with the use of such relatively non-volatile neutralizing agents, the corrosion of the extraction equipment progresses unchecked because of the oxidative deterioration of the solvent and the presence of acidic substances in the vapor phase, the corrosion of such equipment remaining a major problem in the application of solvent extraction processes.

In many extraction processes, furthermore, the stripping stage for recovery of the extracted solute and regeneration of the solvent is effected in a distillation column containing a fractionating section between the still and the reflux condenser, such that if a high molecular weight or non-volatile alkaline compound is added to the solvent, little, if any, of the latter is present in the vapor phase above the still where the volatile corrosive acids are present. On the other hand, if a volatile alkaline compound is introduced into such a system little if any of the latter would be present in the liquid phase present in such an apparatus.

The solvent composition of the present invention is characterized and differentiated by the fact that certain anti-corrosion agents are incorporated as specific additives into the solvent composition to substantially eliminate the corrosion of extraction equipment in contact with the solvent composition in both its liquid and vapor states. One additive component of the present composition is a nitrogenous organic compound having a higher boiling point than the solvent and soluble in the solvent composition, said compound being capable of preventing corrosion of the extraction equipment by virtue of what is believed to be its capacity to preferentially wet the interior surface of the extraction equipment and thus provide a protective coating on the surface in contact with the solvent composition. A second additive component to the present solvent composition is an alkaline organic compound of roughly equal to or relatively greater volatility than the solvent composition, selected from the alkaline amines. Because of its volatility characteristics, such an amine is present at the side of any acid formed in the vapors of the solvent composition, thereby preventing corrosion of the equipment by the solvent in its vapor state. These additive components for the vapor and liquid phases belong to the class of amines and their salts and amide derivatives which are effective in the respective phases at the temperatures and pressures utilized for the solvent extraction process. Their particular characteristics and identity will be referred to in greater detail in the following description.

The present solvent compositions are particularly useful in the solvent extraction of essentially inert mixtures of organic compounds; inert, that is, to the solvent at the operating temperatures and pressures. Although not necessarily limited to hydrocarbon mixtures, the present solvent composition finds its greatest application in the separation of unsaturated hydrocarbons or hydrocarbons of aromatic or cyclic structure from their more saturated or aliphatic analogs, and particularly to mixtures of hydrocarbons having a relatively narrow range of boiling points, such that separation by fractional distillation becomes an impractical procedure, due to the formation of azeotropic mixtures. A particularly appropriate application of the present solvent composition for the separation of mixtures of organic compounds is in the separation of aromatic hydrocarbons from their aliphatic analogs of the same or approximately the same boiling points, since in this type of separation, large volumes of material must be handled in practical size equipment and under commercially feasible operating conditions wherein ordinarily the leakage of air into the system and subsequent conversion of the oxygen-containing solvent to acidic by-products are common occurrences.

Some specific examples of hydrocarbon mixtures which may be separated or extracted into individual hydrocarbon species by the use of the present solvent composition include, for example, propane and propylene; butane, isobutane, butylene-1, butylene-2, and isobutylene; butane or butylene in admixture with butadiene; pentanes, pentenes, isoprene and piperylene; gasoline boiling range naphthas containing one or more aromatic hydrocarbons such as benzene, toluene and xylenes mixed with alicyclic or aliphatic hydrocarbons, such as pentanes, hexanes, cyclohexanes, heptanes and octanes; mesitylene or cumene in admixture with $C_9$ and $C_{10}$ paraffins and isoparaffins; naphthenes, such as methylcyclopentane, cyclohexane, methylcyclohexane and other short chain alkyl-substituted $C_5$ and $C_6$ naphthenes mixed with $C_5$, $C_6$ and $C_7$ paraffins and isoparaffins; bicyclic aromatics such as naphthalene from $C_{10}$, $C_{11}$ and $C_{12}$ monocyclic aromatics, naphthenes, paraffins and isoparaffins; and other hydrocarbon mixtures commonly occurring in the petroleum refining or coal tar industries and as products or by-products of other processes.

Suitable selective solvents for unsaturated organic compounds of both aliphatic and aromatic types of unsaturation utilizable as the solvent component of the present solvent compositions are selected from the generally wide range of compounds of different boiling points and different structural configurations, including the alcohols, aldehydes, ketones, ethers, the alcohol ethers, the halogen-substituted ethers, the esters, and various ether-nitriles as well as nitro-substituted hydrocarbons having the desired boiling point, viscosity and selectivity for the individual mixture to be separated, taking into consideration the equipment in which the extraction is to be effected. Typical alcohols useful as solvent are such compounds as methyl alcohol, ethyl alcohol, propanol, butanol, isobutanol, pentanol, hexanol, various isomeric pentanols and hexanols, and furfuryl alcohol; aryl-substituted alkanols, such as benzyl alcohol; aromatic hydroxy compounds typified, for example, by phenol, the cresols, the naphthols etc. The class of solvents herein characterized as ketones and utilizable as the solvent component of the present composition may be illustrated for example, by acetone, methylethyl ketone, diethyl ketone, cyclohexanone, di-isopropyl ketone etc.; aldehyde-type solvents, comprising another class of the general group of oxygen-containing organic compounds utilizable as the solvent component of the present composition are illustrated, for example, by acetaldehyde, propionaldehyde, butyraldehyde, furfural etc.; utilizable solvents of the ether-type include, for example, dipropyl ether, di-isopropyl ether, dibutyl ether, diphenyl oxide etc.; the glycols, polyoxyalkylene glycols, and glycol ethers which are a particularly preferred class of solvents utilizable for aromatic hydrocarbon extraction, include such specific compounds as ethylene glycol, trimethylene glycol, tetramethylene glycol, glycerol, propylene glycol, diethylene glycol, dipropylene glycol, triethylene glycol, tetraethylene glycol, erythritol, etc.; suitable esters useful as the present solvent components include such compounds as methyl acetate, ethyl acetate, butyl acetate, methyl benzoate, dimethyl phthalate, etc.; ether-nitriles which are another class of solvents particularly preferred herein include such compounds as beta, beta'-oxydipropionitrile, gamma, gamma'-oxydibutyronitrile etc. and mixtures of the above classes and species of solvents, such as mixtures of diethylene and dipropylene glycols, etc.

The solvent composition herein provided usually contains a small quantity of water, sometimes as a necessary constituent, to increase the selectivity of the hydrophilic, oxygen-containing organic compound for unsaturated hydrocarbons or for cyclic hydrocarbons over their more saturated or aliphatic analogs, although the presence of water in the composition is not necessarily an essential ingredient of the solvent compositions provided herein for its utilization in extraction processes. Generally, not more than about 30% by weight of the solvent composition is water and preferably, enough water to provide from about 2% to about 15% by weight of the ultimate composition of water is incorporated in the usual hydrophilic, oxygen-containing organic compound to enhance the selectivity of the solvent for the more highly unsaturated or the aromatic or cyclic component in the hydrocarbon mixture to be separated. The solvent composition thereby becomes more selective for the desired component to be recovered without greatly reducing the capacity of the solvent composition to dissolve the component to be recovered when accompanied by a suitable adjustment of the temperature to increase solubility of the compound to be recovered.

The corrosion preventing additives herein provided actually consist of two individual amines or amine derivatives of different degrees of volatility, such that one additive component remains dissolved in the solvent in its liquid phase as the rich solvent composition is being distilled and the other additive component is relatively more volatile and volatilizes the solvent composition, such that it remains within the distillation zone in the vapor phase as the solvent composition is distilled. Suitable organic amines utilizable in the solvent composition may be selected from the aliphatic, aromatic, naphthenic and heterocyclic amines generally, as well as the alkanolamines containing one or more amino and/or hydroxyl groups per molecule and the polyamines, such as the polyalkylene polyamines. The amine may also be of primary, secondary or tertiary structure and the amide and amine salt types of additive for use in the present solvent composition may be derived by dehydration of salts of the above amines with acids of essentially mineral character or organic acids of aliphatic, aromatic or naphthenic structure. The actual selection of the most appropriate or most suitable amine, amide or amine salt for the vapor phase and liquid phase additives is largely dependent upon the particular selection of solvent, the presence or absence of water in the solvent composition and the presure utilized in the extraction process, all of which factors determine the boiling point of the solvent compositions, and hence determine whether the amine, amide or amine salt selected will remain in liquid or vapor state when the solvent composition is subjected to distillation. For the relatively high boiling solvent compositions containing little or no dissolved water or in solvent extraction processes operated at relatively high pressures, such that the solvent composition boils at a relatively high temperature, it is preferred that an amine, amide, or amine salt of relatively high boiling point be selected as the additive for the solvent composition in its liquid state. Typical amines having relatively high boiling points for use as such or in the form of their amide or salt derivatives, in conjunction with relatively high temperature extraction systems are such compounds as dodecylamine, didodecylamine, phenylenediamine, dicyclohexylamine, quinoline, tribenzylamine, trioctylamine, tolylisopropylamine, tridecylamine, pentadecylamine, tetraethylenepentamine, pentaethylene hexamine, hexaethylene heptamine, heptaethylene octamine, and other ethylene imine polymers, containing up to about 30 carbon atoms per molecule. The above amines or amines of lower molecular weight such as methylamine, dimethylamine, trimethylamine, diethylamine, cyclohexylamine, aniline, toluidine, morpholine, pyridine, piperidine, ethylene diamine, diethylene triamine, and other amines of polyamino structure of aliphatic, aromatic or naphthenic types may be reacted with carboxylic acids to form amine salts (mono- and poly-substituted ammonium salts) or the carboxylic acid salt of the amine may be chemically dehydrated to form an amide derivative and the resulting salt or amide utilized as the anti-corrosion additive component of the solvent composition in liquid state. Thus, for example, methylamine acetate, propionate, butyrate, laurate, tridecanoate, stearate, oleate, linoleate, benzoate, and the corresponding salts of other amines, such as the above salts dimethylamine, trimethylamine, diethylamine, tripentylamine, etc. and such amides as N,N-dimethylformamide, N-methylacetamide, N,N-dimethylacetamide, N-methylpropionamide, N,N-di-iso-propylacetamide, acetanilide, and many other amides of not only the alkyl-, dialkyl-, and arylamines, as well as amides of the heterocyclic amines, and also amide derivatives of various acids, including the fatty or aliphatic acids and aryl carboxylic acids, polybasic acid amides such as oxalic acid amide, citramide, etc. may be used. Another class of amines, comprising one of the preferred additives for the solvent composition in its liquid state are the compounds referred to as the alkanolamines, including the mono-, di-, and tri-alkanol substituted amines containing from 2 to 5 carbon atoms in the alkanol portion of the molecule, such as for example, diethanolamine, triethanolamine, the di- and tri-propanolamines, etc. The latter alkanolamines may also be converted to their salt, ester or (where possible) amide derivatives and utilized as the additive of the solvent composition in the liquid phase, such as ethanolammonium acetate, diethanolammonium laurate, N,N-di-hydroxyethyl-oleic acid amide, etc.

The component of the present solvent composition herein referred to as an anti-corrosion agent for the composition in the vapor state which neutralizes any acids formed in the vapors of the solvent composition when the latter is heated to its boiling point, or when the solvent is used in the presence of a vaporous area, is an amine having a relatively low boiling point compared to the boiling point of the additive for the composition in its liquid state. The boiling point of the vapor phase inhibitor amine should be chosen so that at the temperature and at the concentration at which it is used, its vapor pressure will be sufficient to assure its presence in the vapor phase areas in inhibitive amounts. Suitable amines of this type are the low and intermediate molecular weight mono- and polyamines of either, primary, secondary or tertiary aliphatic structure or cyclic amines of naphthenic, aromatic or heterocyclic character. Typical amines for this purpose are the mono-, di-, and tri-methylamines, methylisopropylamine, butyldimethylamine, tri-n-propylamine, diethylpropylamine, cyclohexylamine, piperidine, N-methylaniline, morpholine, pyridine, 1-methylpyridine, monoethanolamine, monopropanolamine, and others containing up to about 10 carbon atoms per molecule. It is to be emphasized that the selection of the appropriate vapor and liquid phase additives for any particular solvent composition to be operable in both the liquid and vapor phases depends upon the boiling point and temperature of use of the composition. Generally speaking, the additive for the solvent in the liquid phase will be different than the additive for the same solvent in its vapor phase, unless a single compound which boils at or near the temperature of use of the composition is selected, at least a part of the compound thereby being present in and a part of, and therefore, active, in both the liquid and vapor phases of the composition as the rich solvent is distilled during the recovery of extract solute therefrom or as vaporous regions are created during use of the solvent. The lower the boiling point (or use temperature) of the hydrophilic organic compound present in the solvent composition, and the higher the use pressure, the lower the permissible boiling point of both the vapor and liquid phase additives for the composition. Of the above specified classes of suitable compounds as additives herein, the mono-, di-, and tri-alkanolamines are a preferred class of additives for the solvent in its liquid phase, and of the various utilizable alkanolamines, the mono- and tri-ethanolamines are particularly preferred. Of the various classes of amines suitable for use as the additive for the solvent composition in its vapor state, these alkanolamines, as well as the mono-, di-, and tri-alkylene polyamines (particularly the polyethylene polyamines), are generally preferred. Of the latter additives for the solvent composition in its liquid phase, diethylene triamine, triethylene tetramine, and tetraethylene pentamine are particularly preferred herein, for solvents of appropriate boiling point.

Both the extraction and stripping stages of the present operation are preferably effected at a relatively high pressure and temperature, which in turn, depends upon the boiling point of the solvent composition and charging stock, the former being primarily dependent upon the amount of water present in the solvent composition. A particularly suitable method of operating the process comprises effecting the extraction stage at a temperature at which the compound to be recovered from the feed stock mixture has a high solubility in the solvent composition, maintaining the pressure at a level sufficient to maintain the feed stock and solvent composition in the liquid phase at the particular temperature and thereafter, when the rich solvent is transferred to the stripper, reducing the pressure to effect substantially complete vaporization of the dissolved product to be recovered from the rich solvent phase, separately withdrawing the extract product as a distinct fraction from the stripping column and removing lean solvent from the bottom of the stripper, free of dissolved solute. It is evident that in order to provide an additive which is active in the composition for both the liquid and vapor phases, that is, in both the extraction and stripping stages of the process, the individual amines designed to remain in liquid phase during both stages and the amine designed to remain in vapor phase during the stripping stage must be selected on the basis of the temperature and pressure conditions maintained in both stages.

The present invention is further illustrated with respect to various specific embodiments in the following examples which are presented for purposes of illustrating the invention and not for limiting the scope thereof necessarily in accordance with the examples.

EXAMPLE I

A solvent composition is prepared for the specific purpose of extracting the aromatic components from a gasoline boiling range hydrocarbon fraction having an end boiling point of approximately 300° F. and containing the following aromatic hydrocarbons: benzene, toluene and mixed xylenes and containing as well, paraffinic and naphthenic hydrocarbons having up to about 9 carbon atoms per molecule. The composition is a mono-phase solution of diethylene glycol containing approximately 7.5% water (a mixture found to be particularly suitable because of its high selectivity and solubility for aromatic hydrocarbons and its low-solubility for paraffinic hydrocarbons, as well as its relatively high boiling point (about 250° F.) and relatively high stability at temperatures at or near its boiling point), together with a small amount (0.075% each) of a liquid phase amine additive and a vapor phase amine additive, hereinafter identified in the following table. It has been observed on the basis of prior use of diethylene glycol-water mixtures for the extraction of aromatic hydrocarbons from gasoline feed stocks that at temperatures in the region of 250° F. and at pressures of 50 to 100 p. s. i. g., the solvent composition in the absence of liquid and vapor phase amine or other anti-corrosion additives for the liquid and vapor phases tends to absorb sufficient oxygen present within the extraction equipment and during the course of the extraction process to undergo deterioration into gummy deposits and to oxidize into organic acids which cause rapid and deep-seated corrosion of the extraction equipment. It has also been observed, in the use of the above aqueous diethylene glycol as a selective solvent, that the incorporation of an amine into the composition to stabilize the latter in its liquid phase (that is, utilizing an amine which remains liquid during the extracting and stripping stages of the process) eliminates corrosion of the extraction equipment in contact with the liquid solvent composition, but that the portions of the equipment which contact vapors of the solvent composition may continue to undergo rapid and extensive corrosion.

Under some circumstances, the incorporation of a vapor phase corrosion retarder into the solvent composition not only inhibits corrosion of the equipment in contact with the vapor phase, but as a result of the volatilization of acidic oxidation products and their neutralization in the vapor phase region, corrosion in the liquid phase areas may be retarded. However, liquid phase corrosion is not completely stopped under such conditions, and may even be re-activated when the neutralization products of the volatile amine and the volatilized acids are washed back into the liquid phase, since, in many instances, the compounds selected for vapor phase corrosion prevention do not form acid salts effective as liquid phase corrosion retarders. These effects will be shown in other examples herein. The data of the following runs, tabulated in Table I below, indicate the reduction in corrosion which may be realized by incorporating liquid phase amine and vapor phase amine additives in the solvent composition in accordance with the present invention.

In conducting the corrosion tests, a quantity of diethylene glycol was added to the inner of a pair of concentric distillation flasks, each fitted with a separate reflux condenser. The outer flask, which heated the diethylene glycol liquid and vapor present in the inner flask, contained o-dichlorobenzene which was heated to its boiling point and refluxed into the outer reflux condenser to maintain the liquid and vapors of diethylene glycol in the inner flask at a constant temperature of 350° F. The reflux condenser connected with the inner flask was open to the atmosphere, to allow air to enter the inner flask during the test. A strip of mild steel which was thoroughly cleaned with steel wool prior to each test was immersed in the liquid glycol during the test and a second similar strip was suspended in the vapor phase above the liquid glycol. Each strip for each of the tests was weighed before and after the tests and their appearances before and after the test observed and noted. After the test period, the strips were washed, dried, and loose particles of rust or any other deposits thereon were gently removed before the strips were weighed. The acidity of the glycol, indicated by its pH, was determined before and after each run.

*Table I*

CORROSION OF STEEL IN THE LIQUID AND VAPOR PHASES OF DIETHYLENE GLYCOL, WITH AND WITHOUT AMINE ADDITIVES

| Additive for V. P. | Additive for L. P. | Test period, hours | Glycol, pH | | Weight change of steel gr.×10⁴ | | Remarks |
|---|---|---|---|---|---|---|---|
| | | | Before | After | Vapor | Liquid | |
| None | None | 100 | 6.8 | 3.6 | −182 | −25 | Deep corrosion. Both strips badly pitted. |
| Do | 0.02% salt of N-octadecyl-trimethylene-diamine with 1 mol of oleic acid. | 100 | 9.2 | 7.3 | −56 | +12 | Vapor corrosion. Liquid strip gained due to resin deposit. |
| 0.02% triethylamine | None | 100 | 8.7 | 7.1 | 0 | −2 | Strip in vapor remained constant wt. |
| Do | do | 300 | 8.7 | 5.4 | −18 | −40 | Liquid strip more corroded. |
| 0.02% monoethanolamine | do | 100 | 8.5 | 7.2 | +1 | −3 | Substantially no corrosion. |
| Do | do | 300 | 8.5 | 5.7 | −36 | −17 | Some corrosion, both strips. |
| Do | 0.03% salt of N-octadecyl-trimethylene-diamine with dimer of linoleic acid. | 100 | 8.9 | 7.6 | −1 | −2 | Neither strip corroded. |
| Do | do | 350 | 8.9 | 7.1 | −3 | −4 | Neither strip corroded; glycol somewhat darker. |
| 0.05% triethylamine | 0.05% N-octadecyl stearamide. | 300 | 8.4 | 7.2 | +1 | +3 | Neither strip corroded. |

It is evident on the basis of the data indicated above that an anti-corrosion agent is required for both the liquid and vapor phases present within a solvent extraction system in order to reduce corrosion of the extraction equipment in contact with the solvent composition maintained in both liquid and vapor states. In certain instances the additive maintains corrosion at a relatively low level, but resin formation takes place, supposedly through condensation of the oxidation products of the glycol solvent, and the resin accumulates on the internal surfaces of the extraction equipment. In other instances the additive not only reduces the amount of corrosion, but also reduces the tendency of the solvent composition to deposit resinous materials on the test strip.

phase solvent composition the solvent and the equipment specified in Example I, are utilized, except that in the liquid phase corrosion experiments (data in Table II, below), a steel test strip for only the liquid phase is provided and in the second series of runs (data for which is tabulated in Table III below) only a test strip for the vapor phase is provided. In each series, the results indicate that the period of corrosion protection provided for each phase is independent of the other phase. The development of acids in the glycol and the extent of corrosion was measured, as in Example I, by the determination of pH and by loss in weight of the test strip, respectively. The anti-corrosion additives utilized are indicated in the following Tables II and III.

*Table II*

CORROSION OF STEEL TEST STRIP BY LIQUID DIETHYLENE GLYCOL

| Additive | Test period, hours | pH Before | pH After | Weight change in steel gr.×10⁴ | Remarks |
|---|---|---|---|---|---|
| None | 500 | 7.2 | 3.4 | −280 | Test strip deeply pitted. |
| 0.02% salt of N-octadecylene diamine with 1 mol oleic acid. | 500 | 7.8 | 5.2 | +4 | No apparent corrosion. |
| 0.03% salt of N-octadecyltriethylene diamine with dimer of linoleic acid. | 500 | 7.1 | 3.9 | +1 | Effective even after 500 hours because of its high molecular weight and low rate of loss from system. |
| 0.05% N-octadecylamine | 150 | 8.8 | 7.4 | −3 | This amine is effective for 150 hours but not for 500 hours, because of its limited capacity to neutralize and its gradual loss from system. |
| Do | 500 | 8.8 | 3.6 | −22 | |

In a series of test runs similar to those of Example I, above, except that p-methoxy-nitrobenzene is utilized as oxygen containing organic solvent component, it is evident that in the absence of vapor phase and liquid phase anti-corrosion agents in the solvent composition, corrosion of the steel test strip occurs at a rapid rate and results in deeply pitted points of corrosion on the surfaces of the test strips in contact with the vapor phase and liquid phase p-methoxy-nitro-benzene solvent. With the addition of 0.05% diethylenetriamine and 0.03% oleic acid-N-laurylamide to the solvent composition as the respective vapor and liquid phase additives, corrosion was substantially eliminated and deterioration of the solvent to form resinous materials is negligible. In the presence of 0.05% monoethanolamine and azelaic acid N,N'-dioctyl diamide (0.05%) as the respective vapor and liquid phase additives, both the corrosion rate and the tendency to form resinous materials are reduced to negligible levels. The addition of 0.04% dipropanolamine and 0.02% dipropanolamine mono-stearate to the solvent composition also reduced resin formation and corrosion of the steel test strips to a negligible level after runs of 100 hours or more.

The above data indicate that for long term protection against corrosion by the glycol in liquid phase, an additive of high molecular weight, that is, of low volatility is desirable.

*Table III*

CORROSION OF STEEL TEST STRIP BY DIETHYLENE GLYCOL VAPORS

| Additive | Hours | pH Before | pH After | Weight change of steel strip gr.×10⁴ | Remarks |
|---|---|---|---|---|---|
| None | 120 | 6.9 | 3.7 | −136 | Corrosion rapid and extensive. |
| 0.03% salt of N-octadecyltriethylene diamine with linoleic acid dimer. | 120 | 7.0 | 5.5 | −98 | Corrosion by vapors extensive because of low volatility and absence of additive in vapors. |
| 0.05% monoethanolamine | 180 | 9.7 | 8.8 | −2 | Effective for long periods because additive remains in vapor state with glycol. |
| 0.05% diethylene-triamine | 180 | 9.9 | 8.7 | −3 | Effective because active in vapor state. |
| 0.05% N-octadecyl stearamide | 72 | 8.5 | 7.3 | −8 | Effective for relatively short period because of limited capacity in vapor phase. |
| Do | 120 | 8.5 | 4.7 | −63 | |

These data indicate that an effective additive for preventing corrosion by the glycol in vapor phase must be sufficiently volatile to remain in the vapor phase during the course of the operation.

We claim as our invention:

1. A solvent composition capable of maintaining metallic surfaces in contact with the solvent in both its liquid and vapor phases resistant to corrosion consisting essentially of a solution of: (1) a major proportion of an oxygen-containing organic solvent, (2) from 0 to about 20% by weight of water, (3) from 0.001 to about 0.5% by weight of a nitrogen-containing organic compound selected from the group consisting of the amines, the amine salts of fatty acids and the fatty acid amides of lesser volatility than said solvent, and (4) from 0.001 to about 0.5% by weight of a pH-stabilizing amine having a volatility at least equal to that of said solvent.

2. The composition of claim 1 further characterized in that said oxygen-containing organic solvent is a polyoxyalkylene glycol.

3. The composition of claim 1 further characterized in that said pH-stabilizing amine is an alkanolamine.

4. The composition of claim 1 further characterized in that said pH-stabilizing amine is an alkylene polyamine.

EXAMPLE II

In the following runs, one series of which is designed to indicate the effect of one anti-corrosion agent for the solvent in its vapor state and the other series of which is designed to indicate the effect of an additive to the liquid 5. The composition of claim 1 further characterized in that said organic compound of lesser volatility than the solvent is a fatty acid salt of an alkylene polyamine.

6. The composition of claim 2 further characterized in that said polyoxyalkylene glycol is diethylene glycol.

7. The composition of claim 2 further characterized in that said polyoxyalkylene glycol is triethylene glycol.

8. The composition of claim 3 further characterized in that said alkanolamine is monoethanolamine.

9. The composition of claim 3 further characterized in that said alkanolamine is triethanolamine.

10. The composition of claim 4 further characterized in that said alkylene polyamine is ethylene diamine.

11. The composition of claim 4 further characterized in that said alkylene polyamine is diethylenetriamine.

12. The composition of claim 5 further characterized in that said fatty acid salt is an oleic acid salt of said alkylene polyamine.

13. The composition of claim 5 further characterized in that said salt is a fatty acid salt of a polyethylene polyamine.

14. The composition of claim 5 further characterized in that said fatty acid salt is a linoleic acid dimer salt of N-octadecyltriethylenediamine.

15. The composition of claim 5 further characterized in that said fatty acid salt is an oleic acid salt of N-octadecyltriethylenediamine.

16. The composition of claim 13 further characterized in that said polyalkylene polyamine is diethylenetriamine.

17. A solvent composition capable of maintaining metallic surfaces in contact with the solvent in both its liquid and vapor phases resistant to corrosion consisting essentially of a solution of: (1) a major proportion of a polyoxyalkylene glycol, (2) from 0 to about 20% by weight of water, (3) from 0.001 to about 0.5% by weight of a nitrogen-containing organic compound selected from the group consisting of the amines, the amine salts of fatty acids and the fatty acid amides of lesser volatility than said glycol, and (4) from 0.001 to about 0.5% by weight of an alkanolamine having a volatility at least equal to that of said glycol.

18. A solvent composition capable of maintaining metallic surfaces in contact with the solvent in both its liquid and vapor phases resistant to corrosion consisting essentially of a solution of: (1) a major proportion of a polyoxyalkylene glycol, (2) from 0 to about 20% by weight of water, (3) from 0.001 to about 0.5% by weight of a nitrogen-containing organic compound selected from the group consisting of the amines, the amine salts of fatty acids and the fatty acid amides of lesser volatility than said glycol, and (4) from 0.001 to about 0.5% by weight of alkylene polyamine having a volatility at least equal to that of said glycol.

19. A solvent composition capable of maintaining metallic surfaces in contact with the solvent in both its liquid and vapor phases resistant to corrosion consisting essentially of a solution of: (1) a major proportion of a polyalkylene glycol, (2) from 0 to about 20% by weight of water, (3) from 0.001 to about 0.5% by weight of a fatty acid salt of an alkylene polyamine, said salt being of lesser volatility than said glycol, and (4) from 0.001 to about 0.5% by weight of a pH-stabilizing amine having a volatility at least equal to that of said glycol.

References Cited in the file of this patent

UNITED STATES PATENTS 2,582,138    Lane et al. _____ Jan. 8, 1952

OTHER REFERENCES

Industrial and Engineering Chem. vol. 46, No. 12, pp. 2592–98.